Patented Feb. 14, 1950

2,497,394

UNITED STATES PATENT OFFICE 2,497,394

ALKYLAMINOALKYL BENZOATES

Arthur C. Cope, Belmont, Mass., assignor to Sharp & Dohme, Incorporated, Philadelphia, Pa., a corporation of Maryland No Drawing. Original application May 31, 1944, Serial No. 538,201. Divided and this application December 21, 1946, Serial No. 717,817

1 Claim. (Cl. 260—477)

This invention relates to benzoic acid esters of (open-chain) secondary-alkyl(secondary) amino-propanols and -butanols, in which the (open-chain) secondary-alkyl group is wholly hydrocarbon and has a total of less than eleven carbon atoms. These esters are useful as local anesthetics, in general, combining high effectiveness with relatively low toxicity, and are relatively non-irritating.

The compounds of the invention are represented by the general formula

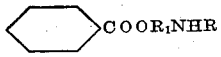

in which R represents a hydrocarbon (open-chain) secondary-alkyl group attached to the amino nitrogen and having a total of less than eleven carbon atoms, and $R_1$ represents the divalent alkylene group, residue of the propanol or butanol, and has a total of from three to six carbon atoms and with at least two and less than four carbon atoms linked in sequence between the nitrogen and the oxygen.

Thus, it is seen that both the alkyl substituent on the amino group and the amino group itself are secondary, and that the secondary amino group is derived from ammonia by replacing one of its hydrogens by the hydrocarbon (open-chain) secondary-alkyl substituent and a second hydrogen by the alkylene group. Accordingly, in this specification and in the claim the expression "(open - chain) secondary - alkyl (secondary)-amino" is used to describe the alkyl-amino grouping on the propanol- and butanol-amine portion of the ester compounds of the invention and to show that the amino group is always secondary and that the alkyl substituent on the amino group is open-chain and always secondary as one of its intermediate carbons is linked to the nitrogen. The (open-chain) secondary-alkyl substituent on the amino group of the alkylaminoalkanol portion of the compounds of the invention contains at least three and less than eleven carbon atoms as in the isopropyl, secondary-butyl, -pentyl, -hexyl, -heptyl, -octyl, -nonyl, and the like. Accordingly, the various (open - chain) secondary - alkyl, as well as the cyclopentyl and cyclohexyl groupings as referred to in my copending application Serial No. 538,201, which has become abandoned, may be unsubstituted as in the specific groupings already mentioned or mono- or poly-substituted by other alkyl groups such as in the di-isobutylmethyl (or 2,6-dimethylheptyl) group and the like.

The esters of the invention are prepared by suitable reaction between benzoic acid anhydride or a benzoyl halide such as benzoyl chloride or bromide with the desired (open-chain) secondary-alkyl(secondary) amino-propanol or -butanol. In preparing the esters starting with an alkylamino-alkanol containing a non-tertiary alcohol group, the benzoyl halide or benzoic acid anhydride is reacted with an addition salt of the desired (open-chain) secondary - alkylaminoalkanol containing the desired (open-chain) secondary-alkyl substituent on its amino group. An advantageous procedure for condensing the benzoyl compound with the salt of the aminoalkanol is to dissolve the aminoalkanol in an inert solvent such as a chlorinated lower paraffin hydrocarbon as chloroform or methylene chloride and the like and to convert it to its addition salt such as the hydrochloride by saturating the solution with dry hydrochloric acid gas, with cooling, and then to add to the solution an equal molal quantity of the benzoyl halide as benzoyl chloride dissolved in an equal quantity of the same solvent, and heating the reaction mixture under reflux at 50 to 60° C., or higher, but preferably at the lower temperature range, then cooling the reaction mixture and removing the solvent under vacuum, and if the free base is desired, then treating the reaction product suspended in water with sufficient suitable alkali as sodium carbonate monohydrate to liberate the free amino ester.

The invention may be illustrated by, but not restricted to, the following examples:

*Example 1—2-isopropylamino-1-butyl benzoate hydrochloride.*—A solution of 13.1 grams (0.1 mol) of 2-isopropylamino-1-butanol in 30 grams of chloroform was satured with dry hydrogen chloride gas, with cooling. A solution of 14.0 grams (0.1 mol) of benzoyl chloride in 30 grams of chloroform was added and the solution was heated in a bath at 50–55° C. for four days under a reflux condenser protected from atmospheric moisture. Then the solvent was removed by vacuum distillation while the mixture was warmed on a water bath. Benzene was then added to the syrupy residue and the reaction product crystallized out after the benzene was removed by vacuum distillation. The crystallized solid residue was washed with anhydrous ether to remove any unreacted benzoyl chloride. The 2-isopropyl-amino-1-butyl benzoate hydrochloride obtained was purified by two recrystallizations from absolute alcohol. It melted at 144–145° C.

*Example 2—2-diisobutylmethylamino-1-propyl benzoate hydrochloride.*—Melting at 108–109.5° C. was obtained by replacing the alkylaminoalkanol of Example 1 by the molal equivalent of 2-diiso-butylmethylamino-1-propanol.

*Example 3—2 - diisobutylmethylamino-1-butyl benzoate hydrochloride.*—Melting at 125–126° C. was obtained by replacing the alkylaminoalkanol of Example 1 by the molal equivalent of 2-diiso-butylmethylamino-1-butanol.

Included also as having similar local anesthetic use are other (open-chain) secondary-alkyl (secondary) amino-alkyl benzoates obtained from alkylaminoalkanols having a non-tertiary alcohol group. These benzoates embrace those having no substituent on the (open-chain) secondary-alkyl nucleus as well as those having a lower alkyl radical linked to one or more of the open-chain carbons. Preferably in those having such hydrocarbon substituent on the (open-chain)-secondary-alkyl group, the total number of carbon atoms in the thus substituted (open-chain)-secondary-alkyl group is less than eleven. These benzoates are prepared by the same procedure as disclosed in Example 1 by replacing the 2-isopropylamino-1-butanol of Example 1 by the corresponding (open-chain) secondary alkylamino-alkanol, for example, 2-(3-pentylamino)-1-, or 2-(4-heptylamino)-1-, or 2-(5-nonylamino)-1-butanol, or -propanol, 2-(sec.-butyl) amino-, or 2-(2-hepytlamino)-, or 2-isopropylamino-2-methyl-1-propanol,3-(3-pentylamino)-, or 3-(2-heptyl amino)-, or 3-(4-heptylamino)-, or 3-(2-octyl-amino)-, or 3-[4-(2,6-dimethylheptyl) amino]-1-propanol, and 1-[4-(2,6-dimethylheptyl) amino]-2-propanol to give additional (open-chain) secondary-alkyl(secondary) amino-alkyl benzoates respectively as follows:

(a) 2-(3-pentylamino)-1-butyl benzoate hydrochloride,
(b) 2-(4-heptylamino)-1-butyl benzoate hydrochloride,
(c) 2-(5-nonylamino)-1-butyl benzoate hydrochloride,
(d) 2-(3-pentylamino)-1-propyl benzoate hydrochloride,
(e) 2-(4-heptylamino)-1-propyl benzoate hydrochloride,
(f) 2-(5-nonylamino)-1-propyl benzoate hydrochloride,
(g) 2-sec.-butylamino-2-methyl-1-propyl benzoate hydrochloride,
(h) 2-(2-heptylamino)-2-methyl-1-propyl benzoate hydrochloride,
(i) 2-isopropylamino-2-methyl-1-propyl benzoate hydrochloride,
(j) 3-(3-pentylamino)-1-propyl benzoate hydrochloride,
(k) 3-(2-heptylamino)-1-propyl benzoate hydrochloride,
(l) 3-(4-heptylamino)-1-propyl benzoate hydrochloride,
(m) 3-(2-octylamino)-1-propyl benzoate hydrochloride,
(n) 3-[4-(2,6-dimethylheptyl)-amino]-1-propyl benzoate hydrochloride, and
(o) 1-[4-(2,6-dimethylheptyl)-amino]-2-propyl benzoate hydrochloride.

Also included are other such benzoates having an (open-chain) secondary-alkyl group attached to the amino nitrogen, which are obtained from other (open-chain) secondary-alkyl(secondary)-aminoalkanols having a tertiary alcohol group according to the procedure of Example 9 of my co-pending application Serial No. 538,201, by reacting the (open-chain) secondary-alkyl(secondary) amino-alkonal having the tertiary alcohol group and containing the desired (open-chain)-secondary-alkyl substituent on its amino group with a substantial excess, such as a 50% excess, of a benzoyl halide or benzoic acid anhydride to form the corresponding benzamide, that is the N-benzoyl derivative of the selected (open-chain) secondary-alkyl(secondary) aminoalkanol, which amide is then rearranged to the corresponding ester hydrochloride, for example, by boiling in absolute alcohol with an excess of concentrated hydrochloric acid. The resulting benzoates, for example, obtained by starting with 1-isopropylamino-, or 1-(3-pentylamino)-, or 1-(2-heptylamino)-, or 1-(2-octylamino)-2-methyl-2-propanol, or 1-isopropylamino-2-methyl (or ethyl)-2-butanol are illustrated by, but not restricted to, the following:

(p) 1-isopropylamino-2-methyl-2-propyl benzoate hydrochloride
(q) 1-(3-pentylamino)-2-methyl-2-propyl benzoate hydrochloride
(r) 1-(2-heptylamino)-2-methyl-2-propyl benzoate hydrochloride, and
(s) 1-(2-octylamino)-2-methyl-2-propyl benzoate hydrochloride.

Particularly advantageous among the compounds described herein are those of the general formula $C_6H_5COO(CH_2)_nCHRNHR_1$, in which $n$ is selected from 1 and 2, and R is selected from hydrogen and the methyl and ethyl radicals, and $R_1$ is the (open-chain) secondary-alkyl radical with less than 11 carbon atoms. Especially effective among this particular group of compounds are those in which $n$ is 1.

The esters of the invention are thus prepared from a wide variety of (open-chain) secondary-alkyl(secondary) amino - alkanols selected from the -propanols and the -butanols, which alkanols then include a wide variety such as the 2-(open-chain) secondary-alkyl(secondary) amino - 1 - alkanols, and 3-(open-chain) secondary-alkyl(secondary) amino - 1 - alkanols, and also 1 - (open-chain) secondary - alkyl(secondary)-amino-2-alkanols, in all of which the alkanol group is selected from the propanol and butanol groups, which alkanol groups may contain the (open-chain) secondary-alkyl(secondary) amino grouping as the sole substituent or may contain additional substituents on the alkanol carbons, such as an alkyl radical, preferably a lower alkyl radical.

The various suitable (open-chain) secondary-alkyl(secondary) amino-propanols and -butanols advantageously may be prepared by condensing a ketone with a primary amino alcohol, with simultaneous or subsequent reduction, the mechanism of which is the formation of an intermediate alkylidene amino alcohol, or the formation of an intermediate oxazolidine or the formation of an intermediate mixture of both. Such advantageous procedure is described in my co-pending application Serial No. 489,499, filed June 3, 1943, but now abandoned, reference to which is made for details of such procedure.

While the various examples show the preparation of the benzoate hydrochloride, if the free base is desired instead, it is prepared by dissolving or suspending the hydrochloride in a small volume of alcohol, diluting with water and treating with an excess over the stoichiometric quantity of sodium carbonate. The liberated free base is extracted with benzene and recovered therefrom in known manner. If a salt of an acid other than hydrochloric acid is desired, then to a solution of the free base, for example, in benzene, there is added the stoichiometric quantity of the particular acid of which the addition salt is desired, and the solvent is then removed by evaporation, under vacuum if desired, and the desired addition salt obtained by crystallization.

The anesthetic compounds of the invention are the free amines, that is, the free bases. Ordinarily they are used in the form of addition salts, for example, as a hydrochloride, sulfate, sulfamate, tartrate, glycolate or other addition salt, as the free amines or bases are quite insoluble in water. The selected salt should have sufficient solubility in water to be completely soluble in the concentrations used, usually of the order of 1% or less. The hydrochlorides and the glycolates are among those particularly therapeutically effective. The esters in which the (open-chain) secondary-alkyl substituent on the amino group has less than eleven carbon atoms, are particularly effective.

While these various individual illustrations of the benzoic acid esters of the invention have been separately named as a certain butyl benzoate or as a certain propyl benzoate, as exemplified in starting with 2-isopropylamino-1-butyl benzoate as in Example 1 and continuing from there through the disclosure ending with 1-isopropylamino-2-ethyl-2-butyl benzoate hydrochloride, insofar as nomenclature is concerned each of the various individual esters embraced in the invention is either a benzoic acid ester of an (open-chain) secondary - alkyl(secondary) amino - propanol or of an (open-chain) secondary-alkyl(secondary) amino-butanol.

This application is a division carved out of my copending application Serial No. 538,201, filed May 31, 1944, which in turn is a continuation-in-part of my copending application Serial No. 505,039, filed October 5, 1943, now Patent No. 2,442,797.

What is claimed is:

A compound which is a member of the group consisting of (a) the benzoate of the 2-diisobutyl-methylamino-1-alkanol wherein the alkanol is a member of the group consisting of 1-propanol and 1-butanol, and (b) its hydrochloride.

ARTHUR C. COPE.

REFERENCES CITED

The following references are of record in the file of this patent:

UNITED STATES PATENTS

| Number | Name | Date |
|---|---|---|
| 837,899 | Emilewicz | Dec. 4, 1906 |
| 1,513,730 | Adams et al. | Nov. 4, 1924 |
| 2,363,081 | Ringk | Nov. 21, 1944 |
| 2,363,083 | Ringk | Nov. 21, 1944 |
| 2,442,797 | Cope | June 8, 1948 |

OTHER REFERENCES

Goldberg et al., "Journ. Am. Chem. Soc.," vol. 61, pp. 3562-3564 (1939).

Ringk et al., "Journ. Am. Chem. Soc.," vol. 65, pp. 1222-1226 (1943).